June 20, 1967 A. L. GOOD 3,325,855
LOW FRICTION HINGE CONNECTION
Filed March 9, 1965 2 Sheets-Sheet 1
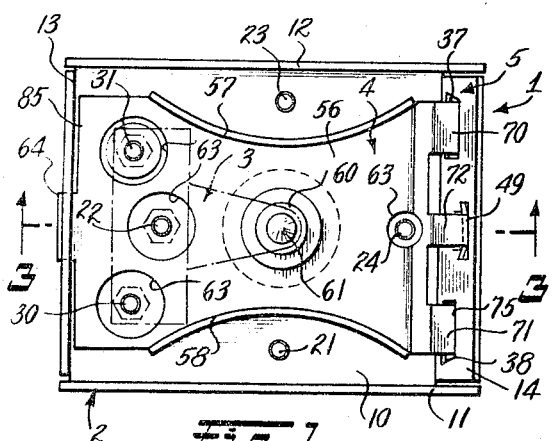
Fig. 1.
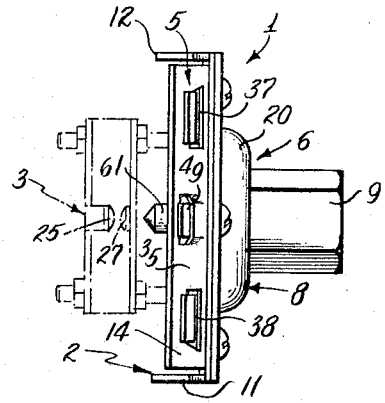
Fig. 2.
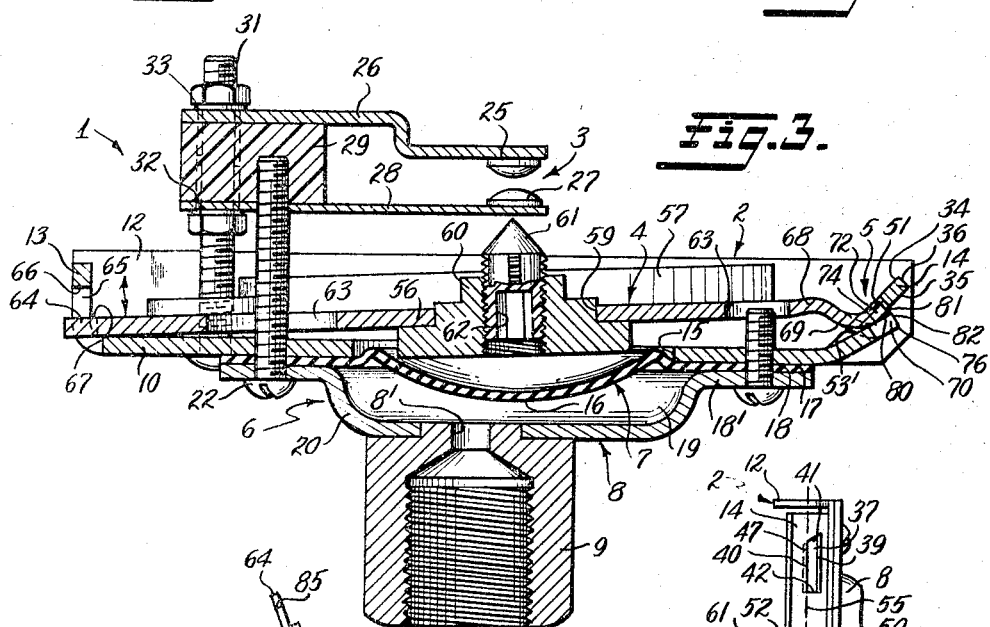
Fig. 3.
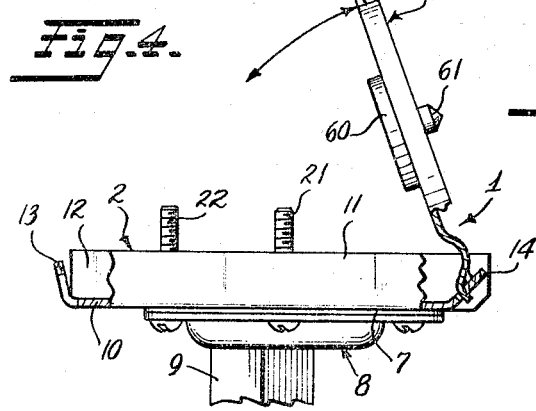
Fig. 4.
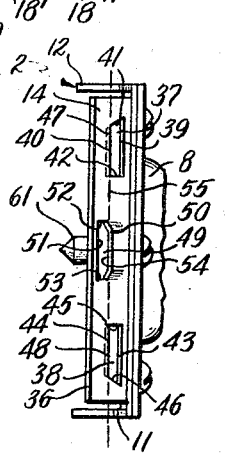
Fig. 2-A.
INVENTOR
Arthur L. Good
BY Arnold & Roylance
ATTORNEYS June 20, 1967
A. L. GOOD
3,325,855
LOW FRICTION HINGE CONNECTION
Filed March 9, 1965
2 Sheets-Sheet 2
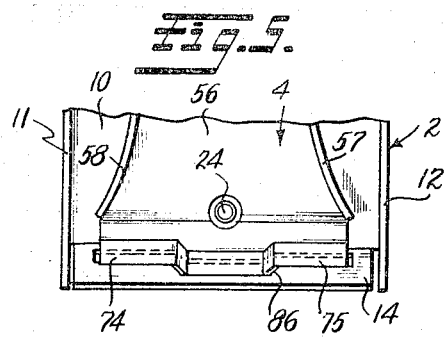
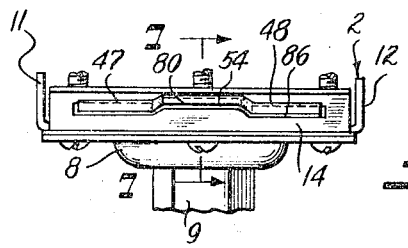
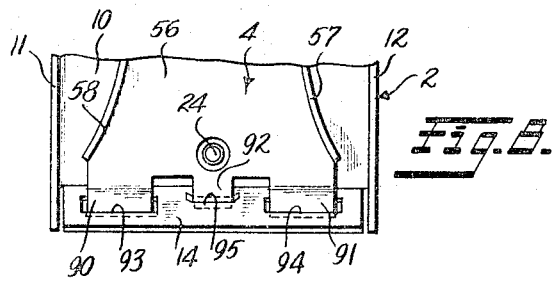
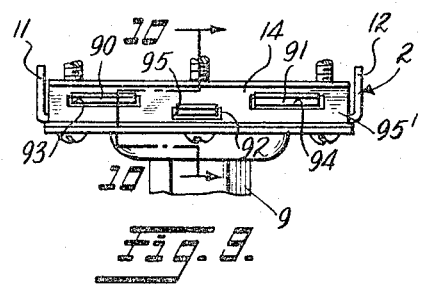
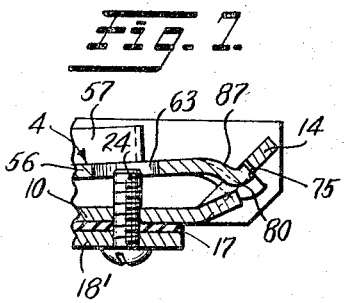
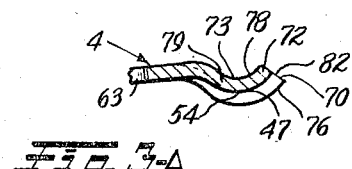
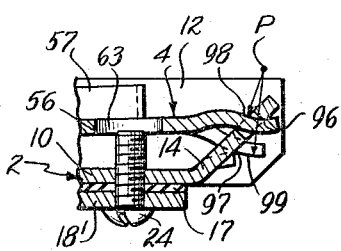
INVENTOR
Arthur L. Good
BY Arnold & Roylance,
ATTORNEYS United States Patent Office 3,325,855
Patented June 20, 1967

3,325,855
LOW FRICTION HINGE CONNECTION
Arthur L. Good, Elkhart, Ind., assignor to Robertshaw Controls Company, Richmond, Va., a corporation of Delaware
Filed Mar. 9, 1965, Ser. No. 438,365
18 Claims. (Cl. 16—184)

This invention relates generally to a hinge connection and particularly to a self-locking hinge connection which facilitates connecting a first member for pivotal movement relative to a second member.

More specifically, this invention relates to a self-locking hinge connection exhibiting extremely low friction operating characteristics and which may be used advantageously to mount an actuator for pivotal movement relative to a support.

In switch assemblies, for example, the pressure operated type, it has been customary, in the past, to mount the actuator for pivotal movement relative to its support at a pin-type hinge connection or on bearing edges formed in the support. The disadvantage of the pin-type hinge connection is the relatively high cost of forming accurately aligned openings in the actuator and support for receiving a hinge pin. The disadvantage of the bearing edge arrangement is that the actuator is "free floating" i.e. is not secured at the pivot connection, and hence, the actuator is frequently displaced relative to the bearing edges, with corresponding loss of predictable operating characteristics of the switch. Although a separate connector is sometimes used to prevent undesired displacement of the actuator, the connector adds to the expense of the unit and also adds an additional assembly step.

In accordance with the present invention applicant provides a self-locking hinge connection which overcomes the shortcomings of the prior art constructions. In the preferred embodiment the hinge connection includes a plurality of collinear bearing edges at the sides of openings in a support member, and a plurality of tabs projecting from an actuator and extending into the openings of the support with the faces of the tabs engaging the bearing edges of the support to provide a pivotal connection. The bearing edges are so arranged that at least one edge faces in a direction generally opposite to the other edges. The tabs of the actuator engage the bearing edges, and the bearing edges exert forces in opposite directions to prevent misalignment of the actuator at the pivotal connection. The tabs each have ends, bent prior to assembly which are dimensioned to extend partially around selected ones of the bearing edges when the actuator is assembled to the support and is within a certain angular operating region. The cooperation of the bent tabs with the bearing edges provides a low friction hinge connection and prevents separation of the actuator from the support. However, privotally moving the actuator to a certain position beyond its angular operating region causes the bent tabs to rotate to a certain position in which the tab ends no longer extend around the bearings, whereupon the actuator can be manually removed from the support. Similarly, to connect the actuator to the support it is merely necessary to position the tabs in approximate alignment with the openings at the certain connecting position, whereupon the tabs can be pushed into the support openings and pivotal movement of the actuator to the operating position locks the actuator to its support for pivotal movement only.

Correspondingly, it is an object of this invention to provide a self-locking hinge connection exhibiting low friction characteristics.

Another object is a self-locking hinge connection for pivotally connecting a first member to a second member for pivotal movement only within a certain predetermined angular operating range.

A further object is a self-locking hinge connection in which a projecting portion of an actuator extends through an opening in a support and the projecting portion of the actuator engages oppositely facing bearing elements of the support to provide a pivotal connection which prevents misalignment of the actuator relative to the support.

A further object is a low friction hinge connection in which a first member is pivotably connected to the second member for pivotal movement only within a certain angular operating limit and yet can be easily disconnected from and connected to the second member at a certain angular position outside the operating limit.

A further object is a self-locking hinge connection particularly adapted to pivotally connect an actuator to its support, the hinge connection being effective to positively prevent misalignment or separation of the actuator from the support.

Another object is a hinge connection comprised of a first member formed from sheet metal which is interlockingly received by a second member, also formed from sheet metal to pivotally connect the members together, the interlocking being accomplished merely by fitting the members together without deforming same or using additional connecting parts or fasteners.

A still further object is to provide a hinge construction of the type described which is economical to manufacture by mass production methods to provide a low friction hinge without exceedingly close manufacturing tolerances.

The following specification, of which the accompanying drawings form a part explains the manner in which the foregoing objects are attained in accordance with this invention. In the drawings:

FIG. 1 is a plan view of a pressure operated switch having a hinge connection in accordance with this invention;

FIG. 2 is a right end view of the switch of FIG. 1 showing the details of the hinge connection;

FIG. 2A is a partial view corresponding to FIG. 2 with the actuator member removed for clarity;

FIG. 3 is an enlarged sectional view taken along lines 3—3 of FIG. 1;

FIG. 3A is an enlarged partial view in section corresponding to FIG. 3 of the hinge end of the actuator with the bearing edges of the support shown in schematic;

FIG. 4 is a side elevational view in section of the FIG. 1 embodiment showing the angular position of the actuator at the time of assembly to the support;

FIG. 5 is a partial view in plan of a second embodiment of the hinge connection;

FIG. 6 is an end view of the hinge connection of FIG. 5;

FIG. 7 is an enlarged partial view in section taken along lines 7—7 of FIG. 6;

FIG. 8 is a partial view in plan of a third embodiment of the hinge connection;

FIG. 9 is an end view of the hinge connection of FIG. 8; and

FIG. 10 is an enlarged partial view in section taken along line 10—10 of FIG. 8.

Referring now to the drawings in detail and particularly to FIGS. 1–3 there is shown a pressure switch assembly 1 comprised of a support 2, a contact assembly 3 mounted on the support, and an actuator 4 disposed between support 2 and contact assembly 3 and connected to the support at a hinge connection designated generally at 5. On the opposite side of support 2 is a pressure responsive operator 6 with a diaphragm 7 and a cover 8 having an aperture 8' communicating with a threaded fitting 9 to connect assembly 1 to a source of control pressure.

Support 2 is of integral construction and is formed from a flat piece of relatively heavy sheet metal of uniform thickness. The support has a rectangular body portion 10 with upwardly bent side wall 11 and 12, and an end wall 13, each wall projecting perpendicularly from body portion 10. At the end of body portion 10 opposite end wall 13 is an outwardly sloping end wall 14 bent upwardly to extend at an angle of approximately 45° with the plane of body portion 10. An opening 15 of circular outline is formed generally centrally of body portion 10. A flexible center portion 16 of diaphragm 7 extends across opening 15, and the outer flat portion 17 surrounding center portion 16 is sandwiched between body portion 10 and flat face 18 of flange 18' to seal the sides of a chamber 19 defined by the diaphragm and the domed center 20 of cover 8. Cover 8 is secured to body 10 by four equally spaced screws 21–24 passing through openings in flange 18' and threaded into openings in body 10.

Contact assembly 3 includes a stationary contact 25 mounted on a rigid contact arm 26 and a movable contact 27 mounted on a resilient contact arm 28 and aligned with contact 25. The contact arms are formed from metal having good electrical conducting characteristics and are mounted in spaced apart relation on an insulating block 29 which in turn is mounted on bolts 30 and 31 fixed to support 2 and located near end wall 13. Contact arms 26 and 28 are fixed to block 29 by the bolts (FIG. 3) and the connection includes flnged insulating bushings 32 and 33 to insulate the contact arms from each other and from support 2. As best seen in FIGS. 1 and 2 the contact arms extend across actuator 4 and are operated by the actuator.

Sloping end wall 14 has a flat upper face 34 parallel with a flat lower face 35 and the end wall terminates at a straight end edge 36. Formed in end wall 14 is a first generally rectangular hinge opening 37 at one side of the end wall, and a second generally rectangular opening 38 at the other side of the end wall, the openings being spaced apart transversely of support 2. Openings 37 and 38 are identical and have their long dimensions transverse to the support and are aligned transversely of the support. Opening 37 has side edges 39 and 40 and end edges 41 and 42. Similarly opening 38 has side edges 43 and 44 and end edges 45 and 46. The openings 37 and 38 are so formed that all the edges 39–46 are perpendicular to lower face 35 of end wall 14. The intersections of side edges 40 and 44 with face 35 define respectively first and second straight sharp bearing edges 47 and 48 which are collinear.

A third elongated generally rectangular opening 49 is spaced equidistantly between openings 37 and 38 and also has its long dimension transverse to support 2. The third opening 49 has opposite side edges 50 and 51 and end edges 52 and 53.

As is apparent with reference to FIGS. 2A and 3 the material of end wall 14 is sufficiently deformed downwardly adjacent edge 50 to provide a flat face 53' the intersection of which with edge 50 defines a third straight sharp bearing edge 54 collinear with bearing edges 47 and 48 but facing in a direction opposite to these edges. As shown in FIG. 2A an imaginary straight line 55 (shown dotted) is collinear with each of the bearing edges. Side edges 39 and 43 of openings 37 and 38 are seen to be spaced to one side of imaginary line 55 whereas side edge 51 of third opening 49 is spaced to the other side of this imaginary line. Thus, it is apparent that openings 37 and 38 open in a direction opposite to third opening 49.

Actuator 4 is made from heavy gauge sheet metal. As shown in FIG. 3 the actuator has a body portion 56 with inwardly bowed upwardly extending side flanges 57 and 58 to increase the beam strength of the actuator. Body 56 has a generally centrally located circular opening 59 into which is press fitted a stepped bushing 60. Bushing 60 has an internally threaded opening to receive an insulated operating pin 61 having a tool receiving opening 62 for a torque transmitting tool to facilitate adjusting the height of operating pin 61 relative to resilient contact arm 28. Body 56 is provided with suitable openings 63 of sufficient size to provide clearance for bolts 22, 24, 30 and 31 within the pivotal operating range of the actuator.

At the end of actuator 4 which is adjacent end wall 13 is a rectangular tip 64 which extends through a transversely extending opening 65 in end wall 13, opening 65 having a surface 66 which faces toward face 67 of tip 64.

The other end of actuator 4 is bent generally sinusoidally to provide a portion 68 which extends above the plane of body 56 and curves downwardly to provide another portion 69 which extends below the plane of body 10 with a bend therein to then cause the end to extend upwardly. As best seen in FIG. 1 the end of actuator 4 is notched to provide first and second spaced apart outer tabs 70 and 71 which extend respectively from the opposite side edges of the actuator, and a third tab 72 spaced midway between tabs 70 and 71. Tabs 70 and 71 are so spaced apart and dimensioned as to be received in openings 37 and 38 respectively and tab 72 is arranged and dimensioned to be simultaneously received in opening 49. Tabs 70 and 71 are each identical and have upwardly bent ends as viewed in FIG. 3. The inner surfaces of tabs 70 and 71 define bearing faces 74 and 75 which face toward and engage bearing edges 47 and 48 respectively, with the actuator in the FIG. 3 position. The bends 73 (FIG. 3A) in tabs 70 and 71 are so formed that end portions 76 of the tabs extend around the respective bearing edges 47 and 48 and lie closely adjacent face 35 of end wall 14. The bend 78 in third tab 72 is formed closer to body 56 than bends 75 so that end 79 of tab 72 is above tabs 70 and 71 when viewed in FIG. 3. The arrangement is such that a bearing face 80 is formed on the outer surface of the bend in tab 72, and this bearing face 80 is essentially coincident with bearing faces 74 and 75 as projected transversely of the actuator (FIG. 3A). Tab 72 has an end edge 81 which is disposed within opening 49 and is closely adjacent side edge 51 of this opening. The end edges 82 of tabs 70 and 71 are essentially coplanar with end edge 81 of tab 72.

Hinge connection 5 is self-locking to facilitate pivotally connecting actuator 4 to support 2. Such connecting is easily done before bolts 30 and 31 are fixed to support 2 and contact assembly 3 is installed. Actuator 4 is connected to support 2 by orienting the actuator as shown in FIG. 4 and tilting same to a position outside its normal operating range so body 56 makes an angle of approximately 70° with the plane of body 10 of the actuator, and by then inserting tabs 70–72 through openings 37, 38 and 49 respectively whereupon mere pivotal movement of the actuator to the FIG. 3 position automatically locks the actuator to the support for pivotal movement only. With actuator 4 in position against body 10 of the support, end wall 13 is bent inwardly from its FIG. 4 position to its FIG. 3 position whereupon surface 66 of opening 65 extends across the face 67 of tip 64 and the actuator is confined to pivotal movement between the position of FIG. 3, in which the actuator engages body 10, to a second position in which face 67 engages surface 66. It is to be noted that openings 63 are sufficiently large to provide clearance for pivoting the actuator within its angular operating range.

The end edge 85 of actuator 4 on each side of tab 64 is spaced from the inner surface of end wall 13 as best seen in FIG. 1, to provide operating clearance to assure that end edge 85 will not engage the inner surface of end wall 13.

After the actuator is in position bolts 30 and 31 are secured to the support and contact assembly 3 is fixed to the bolts. To compensate for slight inaccuracies in manufacture of the actuator, support, or contacts operating pin 61 can then be adjusted to provide the proper operating clearance between its tip and the side of resilient contact arm 28 which faces toward the tip. Then diaphragm 7 and cover 8 can then be installed in the manner previously described using screws 21–24. A protective casing (not shown) may be connected to the ends of bolts 30 and 31 to extend around and protect the contacts when switch assembly 1 is in use. A suitable control pressure source is connected to fitting 9, and after the appropriate electrical connections have been made to contact arms 26 and 28 the assembly is ready for operation.

An increase in pressure in chamber 19 transmitted from the pressure source deforms portion 16 of diaphragm 7 against the flat lower surface of stepped bushing 60. Further increase in pressure causes the diaphragm to pivot actuator 4 in a clockwise direction as viewed in FIG. 3. Such pivotal movement causes the tip of operating pin 61 to engage the lower surface of resilient contact arm 28 to flex the contact arm and move movable contact 27 into engagement with stationary contact 25 to complete the desired electrical circuit. Damage to the contacts and contact arms due to an unexpected overpressure in chamber 19 is prevented by engagement of face 67 of tab 64 with stop surface 66, such engagement serving to positively limit the extent of pivotal movement of actuator 4 toward the contact assembly. A decrease in pressure in chamber 19 allows actuator 4 to pivot counterclockwise to open the contacts.

With reference to FIG. 3A it is apparent that bearing edges 47 and 48 exert a downward force, as viewed in FIG. 3A, upon bearing faces 74 and 75, and third bearing edge 54 exerts an upward force on third bearing face 80. Since there is line contact between each of the bearing edges and the bearing faces it is apparent that there can be no tipping or misalignment of the actuator relative to the support in a vertical direction at the hinge connection. Since bearing faces 74 and 75 extend around bearing edges 47 and 48 and lie very closely adjacent face 35 of end wall 14 a shock or impact which tends to pull actuator 4 longitudinally away from hinge connection 5 is resisted by engagement of these bearing faces with the bearing edges (assuming that the force is insufficient to deform the tabs). Likewise, a force tending to move actuator 4 longitudianlly toward end wall 14 is resisted by the portion of bearing faces 74 and 75 which are inside openings 37 and 38. Excessive movement of the actuator toward the end wall is positively prevented by engagement of end edge 81 of tab 72 with side edge 51 of opening 49, the side edge 51 functioning as a stop surface. It is to be appreciated that this locking connection is the result of actuator 4 pivoting about an axis which is offset slightly above and parallel with the imaginary line 55 which extends through the bearing edges. This fact is best visualized by considering the axis about which the actuator pivots as the center line of a hinge pin and the bearing faces 74 and 75 as that portion of the hinge which bears against the cylindrical surface of the hinge pin. With this analogy in mind it is evident that each of bearing faces 74, 75 and 80 slide on bearing edges 47, 48 and 54 respectively during pivotal movement of the actuator but resist longitudinal movement of the actuator.

It is to be noted that end edges 41 and 46 of openings 37 and 38 respectively slope toward the center of support 2 and are closely adjacent the outer side edges 54' of tabs 70 and 71. Forces acting on the actuator which tend to move same in a direction axially of the hinge connection can move the actuator only until the appropriate one of end edges 41 and 46 is engaged by a side edge 54'. Such engagement is merely line or point contact at the side edge 54' of one of the tabs. Due to the line contact the frictional forces acting to resist pivotal movement because of an axial force remain very low even when the axial force is of considerable magnitude. To assure line contact only, and only at edges 54', each of openings 37, 38 and 49 is sufficiently long and tabs 70–72 are of such width that there is no possibility of engagement of the other side edges of the tabs with any of the side edges 42, 45, 52 or 53 of the openings. It is apparent that the engagement of one of outer side edges 54' with the appropriate one of end edges 41 and 46 serves to prevent further axial movement of the actuator.

In view of the foregoing description it is apparent that support 2 provides a first member having first and second elongated bearing elements in the form of bearing edges 47 and 48, and a third bearing element in the form of a bearing edge 54. Pivotally connected to the support is actuator 4 that provides a second member with first and second bearing portions in the form of bearing faces 74 and 75, and a third bearing portion in the form of bearing face 80 which faces in a direction opposite to bearing faces 74 and 75. Within the limits of its angular operating range actuator 4 is locked to support 2 at hinge connection 5, but can be connected to or disconnected from the support by pivoting the actuator beyond its operating range as shown in FIG. 4.

FIGS. 5–7 show a variation of the embodiment of FIGS. 1–4. The basic difference between the embodiment of FIGS. 5–7 and that of FIGS. 1–4 is that a continuous slot 86 is provided in end wall 14 of the support and the bearing end of the actuator is provided with a continuous end 87 which extends through the slot. The variation as shown in FIGS. 5–7 is best visualized by imagining that the material between the openings 37 and 49 of the FIG. 2 embodiment is cut away, and that the material between openings 38 and 49 is also cut away, in each instance to provide a continuous slot with the bearing edges 47, 48 and 54 identically arranged. End 87 of the actuator is continuous rather than notched and is deformed to provide first and second bearing faces 74 and 75, and a third bearing face 80 identical to the corresponding bearing faces of FIG. 2. Suffice it to say that, save for the differences stated, the embodiment of FIGS. 5–7 is identical to that of FIGS. 1–4.

A third embodiment of the invention is shown in FIGS. 8–10. In this embodiment first and second tabs 90 and 91 are spaced on each side of a third tab 92. The tabs extend through openings 93–95 in the same manner as the FIGS. 1–4 embodiment. The side edges of openings 93 and 94 at their intersection with face 95' define a pair of elongated collinear bearing edges 96, which are substantially identical to bearing edges 46 and 47. The side edge of opening 95 defines a bearing edge 97, similar to edge 54 and which faces in a direction opposite to edges 96 but is parallel with and spaced from the line defined by edges 96. As shown in FIG. 10 edges 96 are engaged by bearing faces 98 of tabs 90 and 91. Likewise, bearing edge 97 is engaged by bearing face 99 of tab 92. With reference to FIG. 10, it is seen that each of bearing faces 98 and 99 is arcuately curved about the same point P and it is thus apparent that the radius of curvature of bearing face 98 is somewhat less than the radius of curvature of bearing face 99. It is also apparent that the center of pivotal movement of actuator 4 is about point P when the actuator is pivoted. It is also to be appreciated that the embodiment of FIGS. 8–10 enjoys the same advantages as those set forth for the FIGS. 1–4 embodiment.

Although several preferred embodiments have been shown and described, in each instance in the environment of a pressure operated switch, it is to be appreciated that the hinge connection of this invention has other applications and uses, and that the invention as defined in the appended claims is not restricted to use where both the actuator and support are disposed in a horizontal position with the hinge also horizontal but that the actuator and support assembly may be used in any position without materially affecting the operating characteristics of the device with which the hinge is associated.

I claim:

1. A hinge connection between two members, at least one of which is pivotable relative to the other, and wherein one of the members is releasably locked to the other against removal, comprising in combination a first member;

a second member pivotally connectable to said first member;

said first member including,
> first and second elongated bearing elements in aligned longitudinally spaced relation and each facing in a first direction, and
> a third bearing element coplanar with said first and second bearing elements and facing in a second direction generally opposite to said first direction;

said second member having a projecting portion including,
> first and second bearing portions spaced apart transversely of said second member and facing in said second direction, and a third bearing portion facing in said first direction said first and second bearing portions each being in enengagement respectively with said first and second bearing elements, and said third bearing portion engaging said third bearing element to provide a pivotal connection for pivotal movement of said members relative to each other within a certain predetermined angular operating limit;

said first and second bearing elements cooperating with said first and second bearing portions to resist movement of one of said members in said second direction, and said third element cooperating with said third bearing portion to resist movement of said one of said members in said first direction, whereby tipping of said members relative to each other in a direction transverse to said pivotal connection is prevented; and at least one of said bearing portions extending partially around the bearing element it engages to prevent separation of said first and second members in a direction radially of said pivotal connection but only when said members are within said certain predetermined angular operating limit;

the extent to which said at least one of said bearing portions extends around the bearing element it engages being such that pivotal movement of said members to a position beyond said predetermined angular operating limit permits separation and connection of said members at said pivotal connection.

2. A hinge connection in accordance with claim 1 in which
said first, second and third bearing portions are defined by bent faces of said projecting portion of said second members.

3. A hinge connection in accordance with claim 1 in which
said first, second and third bearing elements include elongated bearing edges which engage said first, second and third bearing portion, respectively.

4. A hinge connection in accordance with claim 3 in which all said bearing edges are collinear.

5. A hinge connection in accordance with claim 1 in which
said first member is formed from a single piece of flat sheet metal; and
said second member is formed from a single piece of flat sheet metal.

6. A hinge connection in accordance with claim 1 in which,
said first member further includes a stop face formed in the material thereof; and
said second member further includes a stop element at at said projecting portion;
said stop element being engageable with said stop face at a certain angular position within said angular operating limit to positively prevent movement of said first and second members toward each other across said pivotal connection, whereby misalignment of said members is positively prevented.

7. A hinge connection in accordance with claim 1 which further includes
means adjacent the ends of at least one of said bearing elements to prevent movement of said members axially of each other.

8. A low friction hinge connection between a support and an actuator in which the actuator is pivotable relative to the support and is releasably locked to the support against removal at the hinge connection comprising in combination,
a support;
an actuator pivotally connectable to said support
said support comprising,
> first and second elongated bearing edges in longitudinally spaced apart relation and each facing in a first direction, said first and second edges being collinear; and
> a third bearing edge substantially collinear with said first and second bearing edges but facing in a second direction generally opposite to said first direction;

said actuator having a projecting portion engageable with said support and including,
> first and second bearing portions in aligned spaced apart relation transversely of said actuator and facing in said second direction; and
> a third bearing portion facing in said first direction, said third bearing portion being approximately aligned with said first and second bearing portions;

said first and second bearing portions engaging said first and second bearing edges along a substantially straight line of contact, said third bearing portion engaging said third bearing element substantially along said straight line of contact to provide a pivotal connection for pivotal movement of said members relative to each other with a certain predetermined angular operating limit;

said first and second bearing edges cooperating with said first and second bearing portions to resist movement of said actuator in said second direction, and said third bearing edge cooperating with said third bearing portion to resist movement of said actuator in said first direction, whereby misalignment of said actuator relative to said support in said first and second directions is prevented; and at least one of said bearing portions extending partially around the bearing edge it engages to prevent separation of said actuator from said support at said pivotal connection in a third direction different from and oblique to said first and second directions, but only when said actuator is within said certain predetermined angular operating limit;

the extent to which said at least one of said bearing portions extends around the bearing element it engages being such that pivotal movement of said actuator to a position beyond said predetermined angular operating limit permit separating of said actuator from and connection of said actuator to said support at said pivotal connection.

9. A hinge connection in accordance with claim 8 in which,
said first and second bearing portions are defined by bent faces of said projecting portion of said actuator; and
said third bearing portion is defined by an arcuately curved face of said projecting portion.

10. A hinge connection in accordance with claims 8 in which
said third bearing portion is between and spaced from the adjacent ends of said first and second bearing portions.

11. A hinge connection in accordance with claim 8 in which
said support has first, second, and third openings; and said bearing edges are defined by the material of said support adjacent said openings.

12. A hinge connection of the type described comprising in combination:
- a sheet metal support;
- a sheet metal actuator pivotaly connectable to said support;
- said support including
  - a body,
    - a wall portion projecting from said body and having first, second and third openings therein,
    - first and second elongated bearing edges presented by said wall portion at said first and second openings respectively, and
    - a third bearing edge presented by said wall portion at said third opening;
  - said first and second bearing edges being collinear and facing in a first direction;
  - said third edge being substantially collinear with said first and second edges and facing in a second direction generally opposite to said first direction;
- said actuator including,
  - a body,
    - first and second bent tabs projecting from said body in spaced apart relation transversely thereof, said tabs presenting first and second bearing portions respectively, said bearing portions facing in said second direction; and
    - a third bent tab projecting from said body and presenting a third bearing portion facing in said first direction;
  - said first, second and third tabs extending through said first, second and third openings respectively, and said bearing portions being in engagement respectively with said bearing edges to provide a pivotal connection;
  - engagement of said first and second bearing portions with said first and second bearing edges preventing movement of said actuator in said second direction at said pivotal connection, and engagement of said third bearing portion with said third bearing edge preventing movement of said actuator in said first direction at said pivotal connection;
  - said first and second bent tabs extending partially around said first and second bearing edges to prevent separation of said actuator from said support in a direction transverse to said pivotal connection but only when said actuator is within a certain angular operating region relative to said support;
  - the extent to which said first and second tabs extend around said bearing edges being such that movement of said actuator pivotally to a position outside said angular operating region frees said tabs from said bearing edges to permit disconnecting said actuator from and connecting said actuator to said support, whereby assembly of said pivotal connection is facilitated.

13. A hinge connection in accordance with claim 12 in which
- said wall portion of said body further includes oppositely facing surfaces engageable with the side edges of one of said tabs to restrain said actuator against movement axially of said pivotal connection.

14. A hinge connection in accordance with claim 12 in which
- said actuator pivots about an axis parallel with and spaced from said bearing edges.

15. A hinge connection in accordance with claim 12 in which
- said third opening includes a stop surface at the side thereof opposite said third bearing edge, and
- said third tab is engageable with said stop surface to prevent movement of said actuator toward said pivotal connection when said actuator is within said certain angular operating region.

16. A hinge connection in accordance with claim 12 in which
- said support further includes means to prevent pivotal movement of said actuator beyond said certain angular operating region.

17. A hinge connection in accordance with claim 16 in which
- said means is a face of said support engageable with a face of said actuator.

18. A hinge connection in accordance with claim 13 in which
- said oppositely facing surfaces are at an angle to said side edges to provide line contact between said edges and surfaces when engaged;
- whereby low friction pivotal movement of the actuator is assured when the surfaces engage the edges due to a force axially of the hinge connection.

References Cited

UNITED STATES PATENTS

| | | | |
|---|---|---|---|
| 510,896 | 12/1893 | Crane | 16—184 |
| 2,158,955 | 5/1939 | Blacher | 16—184 |

MARVIN A. CHAMPION, *Primary Examiner.*

D. L. TROUTMAN, *Assistant Examiner.*